United States Patent [19]

Shirako

[11] Patent Number: 4,561,033

[45] Date of Patent: Dec. 24, 1985

[54] PAD APPARATUS FOR MAGNETIC TAPE CASSETTE

[75] Inventor: Hideo Shirako, Tokyo, Japan

[73] Assignee: Olympus Optical Co., Ltd., Tokyo, Japan

[21] Appl. No.: 438,538

[22] Filed: Nov. 1, 1982

[30] Foreign Application Priority Data

Nov. 13, 1981 [JP] Japan ............... 56-169132[U]

[51] Int. Cl.[4] ............................................. G11B 15/62
[52] U.S. Cl. ............................................. 360/130.33
[58] Field of Search ............... 360/130.33, 130.32, 360/130.31, 130.3, 132; 242/199, 197

[56] References Cited

U.S. PATENT DOCUMENTS 4,087,845  5/1978  Saito .................................. 360/130

FOREIGN PATENT DOCUMENTS 53-80425  7/1978  Japan .

Primary Examiner—Stuart N. Hecker
Assistant Examiner—Benjamin E. Urcia
Attorney, Agent, or Firm—Frishauf, Holtz, Goodman & Woodward

[57] ABSTRACT

In a pad apparatus for a magnetic tape cassette for bringing a magnetic tape running in one direction into close contact with a core on the surface of a head of a tape recorder for recording or reproducing, a pad has a surface which faces the surface of the head with the magnetic tape between them. Formed in the surface of the pad is an incision which divides it into first and second pad sections of substantially equal area, the first pad section corresponding to a first surface portion of the head including the core in the surface of the head, and the second pad section corresponding to a second surface portion of the head except the core. The pad is provided with urging means for urging it so that the first and second pad sections are brought into close contact with the first and second surface portions, respectively, of the head.

8 Claims, 4 Drawing Figures

PAD APPARATUS FOR MAGNETIC TAPE CASSETTE

BACKGROUND OF THE INVENTION

This invention relates to a pad apparatus provided in a tape cassette, more specifically to a pad apparatus which presses a magnetic tape against a head of a tape recorder to bring the magnetic tape into close contact with a core provided on the surface of the head on operating a tape cassette.

In general, a cassette recorder is provided with a head having a core on its surface which has tape recording and reproducing functions. In particular, a head of a stereo-type cassette recorder is provided with two cores located at the lower side portion of its surface and separated from each other. One core has recording and reproducing functions for an L-channel (right channel), while the other core has those for an L-channel (left channel).

In recording on or reproducing from a cassette tape, a tape cassette is set in a tape recorder, and a magnetic tape in the cassette is pressed against a pad apparatus so as to be in close contact with a head. In some cases, however, foreign substances, such as dust, may be caught between the surface of the head and the magnetic tape.

In recording on or reproducing from a conventional stereo-type micro cassette tape, if a foreign substance 10 sticks to the upper side portion of the surface of a head 20, as shown in FIG. 1, then a gap 14 will be formed between the upper side portion of the head 20 and a magnetic tape 12. The foreign substance 10 would force up a pad 17 to deform it, the deformation of the pad 17 reaching the lower side thereof where an R-channel core 16 is located. Thus, the magnetic tape 12 fails to be brought into close contact with the R-channel core 16. Therefore, the input or output level of the R-channel core 16 will be lower than that of an L-channel core 18. In other words, if any foreign substance is caught between a head and a cassette tape, a gap will be formed between a core and the tape to deteriorate the recording or reproducing function of the tape recorder.

SUMMARY OF THE INVENTION

The object of this invention is to provide a pad apparatus capable of preventing the deterioration of recording or reproducing functions by normally bringing a magnetic tape into close contact with a core even if a foreign substance is caught between a head and the magnetic tape.

DETAILED DESCRIPTION OF THE PREFERRED EMBODIMENT

There will now be described in detail one embodiment of this invention with reference to FIGS. 2 to 4.

Figure 1:
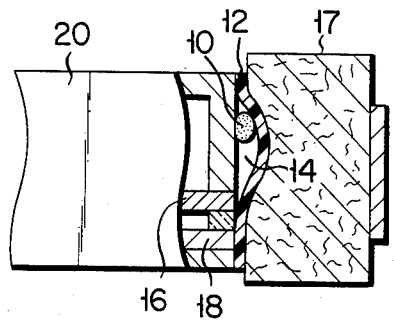
FIG. 1 is a sectional view showing how a foreign substance is caught between a magnetic tape and a head of a stereo-type cassette recorder when a prior art pad apparatus presses a magnetic tape against the head.
Figure 2:
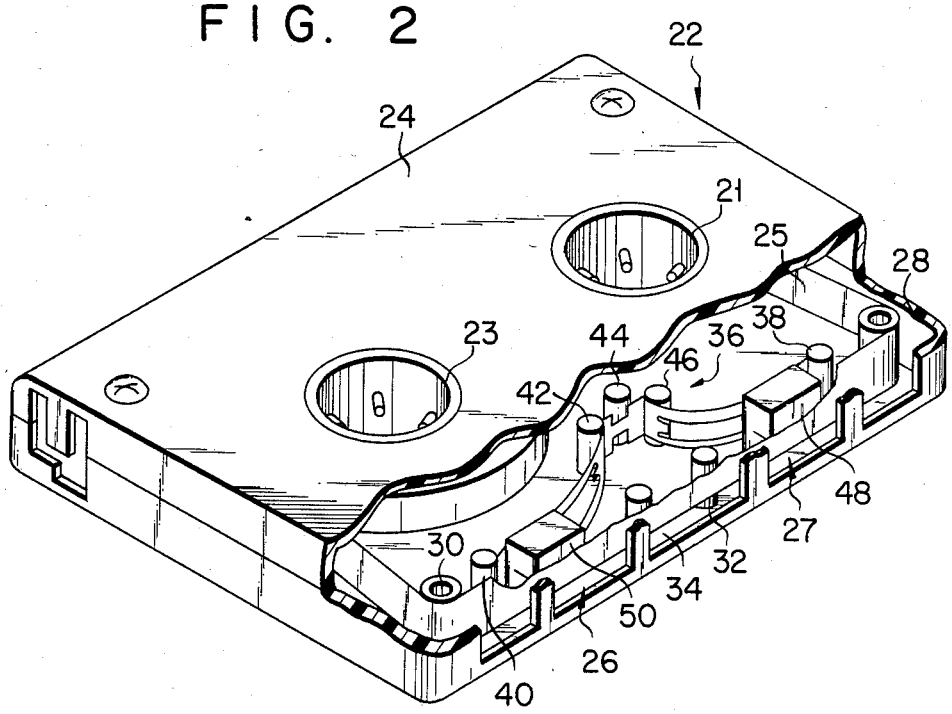
FIG. 2 is a perspective view of a tape cassette with a pad apparatus according to one embodiment of this invention.

As shown in FIG. 2, a stereo-type micro cassette 22 has a casing 24. Housed in the casing 24 is a magnetic tape 25 both ends of which are wound individually around two hubs 21 and 23. The casing 24 has openings 26 and 27 in one lateral face thereof in which heads (shown in FIG. 4) of a tape recorder are inserted for recording on or reproducing from the magnetic tape 25. Guide rollers 28 and 30 for guiding the magnetic tape 25 are rotatably supported in the casing 24 at both end portions thereof, arranged along the one lateral face of the casing 24. Arranged between the guide rollers 28 and 30 are guide pins 32 and 34 which guide the magnetic tape 25 along the one lateral face of the casing 24. Inside the casing 24, a pad apparatus 36 is provided in face of the back of the magnetic tape 25, that is, that side of the tape 25 which engages the outer peripheral surfaces of the guide rollers 28 and 30. To support the pad apparatus 36, a pair of first supporting pins 38 and 40 are disposed in the casing 24 in close vicinity to the back of the magnetic tape 25 and at a space from each other. Second supporting pins 42, 44 and 46 are arranged substantially halfway between the two first supporting pins 38 and 40. Engaging the first and second supporting pins, the pad apparatus 36 is supported in the casing 24.

Figure 3:
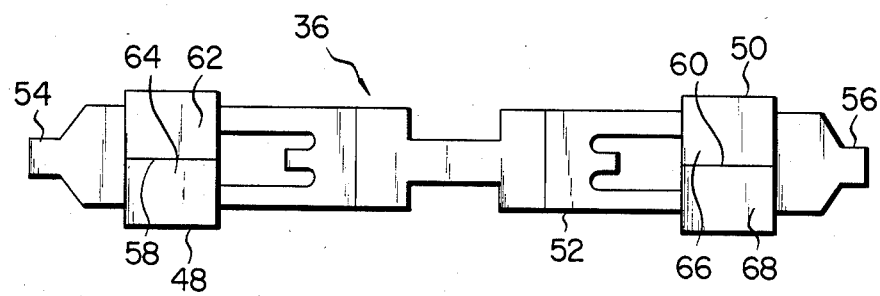
FIG. 3 is a front view of the pad apparatus shown in FIG. 2.

As shown in FIG. 3, the pad apparatus 36 is provided with a substantially V-shaped leaf spring 52. Two felt pads 48 and 50 each in the form of a rectangular prism are attached individually to both end portions of the leaf spring 52. Both extreme ends 54 and 56 of the leaf spring 52 project so as to engage the first pins 38 and 40, respectively. The major surfaces of the pads 48 and 50 are located substantially parallel to the magnetic tape 25 so that the magnetic tape 25 can be closely in contact with the head during the recording or reproducing.

The pads 48 and 50 have incisions 58 and 60 in the central portions of their respective surfaces. The incisions 58 and 60 extend parallel to the driving direction of the magnetic tape 25 to cross the pads 48 and 50, respectively. The surface of the pad 48 is divided into first and second sections 62 and 64 by the incision 58 therein. Likewise, the surface of the pad 50 is divided into first and second sections 66 and 68 by the incision 60 therein. The depth of each of the incisions 58 and 60 is half the thickness of each of the pads 48 and 50.

There will now be described the operation of the apparatus according to this embodiment.

In driving the magnetic tape 25 in one direction for the recording or reproducing, a head 70 (FIG. 4) of the tape recorder is inserted into the casing 24 through the opening 27 to push the magnetic tape 25 toward the inner part of the casing 24. At the opening 27, the pad 48 is held against the back of the magnetic tape 25 which is in contact with the inserted head 70. As the head 70 is inserted, therefore, the pad 48 is biased on the inside of the casing. Accordingly, the extreme end 54 of the leaf spring 52 corresponding to the pad 48 is separated from the first supporting pin 38, so that the urging force of the leaf spring 52 acts on the surface of the head 70 through the medium of the magnetic tape 25. Thus, the magnetic tape 25 is pressed against the surface of the head 70 by the pad 48.

Figure 4:
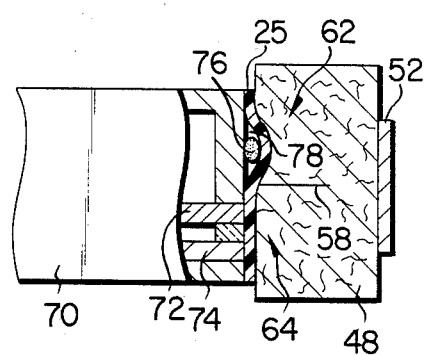
FIG. 4 is a sectional view showing how a foreign substance in caught between a magnetic tape and a head when the pad apparatus of FIG. 2 presses a magnetic tape against the head.

As shown in FIG. 4, R- and L-channel cores 72 and 74 are arranged at the surface portion of the head 70 so as to correspond to the second section of the pad, the R-channel core 72 overlying the L-channel core 74. The R- and L-channel cores 72 and 74 have recording and reproducing functions for right and left channels, respectively.

If any foreign substance 76, such as dust or sand, is caught between the magnetic tape 25 and the upper portion of the head 70 or that portion which corresponds to the first section 62 of the pad 48 when setting the micro cassette 22 in the stereo-type micro cassette recorder for the recording or producing, the surface of the pad 48 is forced up by the foreign substance 76 through the magnetic tape 25. Then, the surface of the pad 48 is deformed to create a gap 78. However, the gap 78 is elastically absorbed at the first section 62 of the pad 48 divided by the incision 58. Thus, the gap 78 terminates at the incision 58 without extending to the first section 62. Accordingly, even if the foreign substance is caught between the first section 62 of the pad 48 and the head 70, the R- and L-channel cores 72 and 74 are normally in contact with the magnetic tape 25.

In performing a recording or producing operation on the other track of the magnetic tape 25 after turning over the micro tape cassette 22, the other pad 50 is pressed against the head 70 with the magnetic tape 25 between them. Thereafter, the pad 50 acts in the same manner as the pad 48.

According to the present invention, even if any foreign substance is caught between the head and the magnetic tape, both R- and L-channel cores are normally in contact with the magnetic tape. Thus, the recording and reproducing capability of the tape recorder may securely be prevented from being deteriorate by a gap defined between the head and the magnetic tape.

The tape driving speed of a micro cassette is about half that of a compact cassette. Thus, the recording density of the magnetic tape in the micro cassette is high, so that it is necessary to reduce spacing loss by minimizing the gap between the head and the magnetic tape. As is evident from the above description, the pad apparatus of this invention may more effectively be applied to the micro cassette.

Since the incisions 58 and 60 are located in the central portions of the pads 48 and 50, respectively, the recording on or reproducing from the other track of the magnetic tape may be performed with the same effect.

The same effect may be obtained when the apparatus of this invention is used in a tape recorder with an auto-reverse function in which two cores are located individually at the upper and lower side portions of a head, as well as in a conventional stereo-type micro tape recorder in which a single core is located in a biased manner at the lower side portion of the surface of the head.

In the above embodiment, the incision in the surface of a pad is located at the central portion of the surface, and extends parallel to the tape driving direction. It is necessary, however, only that the incision be so located that a gap generated between the head and the magnetic tape by a foreign substance may not reach the core or cores. For example, the incision may be located and biased on one side of the pad surface or be slanted. The depth of the incision need only be such that the pad should not be cut in two. This is because the rear surface of the pad must be attached to the leaf spring.

In the above embodiment, moreover, the pad apparatus is applied to a micro cassette which has two pads attached individually to both ends of a leaf spring. However, the pad apparatus may also be applied to a compact cassette which has a single pad attached to the central portion of a leaf spring.

What is claimed is:

1. A pad apparatus for a magnetic tape cassette for bringing a magnetic tape running in one direction into close contact with a head of a tape recorder for recording or reproducing, comprising:

a pad having a surface which faces the surface of the head with the magnetic tape therebetween, said pad having a single incision therein at the central portion of the surface of the pad, said incision extending substantially parallel to the running direction of the tape and dividing the surface of the pad into first and second pad sections, said first and second pad sections being substantially equal in area; and urging means attached to the pad to urge the same so that the first and second pad sections are brought into close contact with the said first and second surface portions, respectively, of the head.

2. An apparatus according to claim 1, wherein said incision in the pad extends along the overall width of the pad.

3. An apparatus according to claim 2, wherein the depth of said incision in the pad is about half the thickness of the pad.

4. An apparatus according to claim 1, wherein said urging means includes a leaf spring.

5. An apparatus according to claim 4, wherein the leaf spring has a substantially central portion and end portion on opposite sides of the central portion, the substantially central portion of said leaf spring being supported by the tape cassette, and comprising one of said pads having said incision therein attached to each end portion of the leaf spring.

6. An apparatus according to claim 1, wherein said incision extends only partially through the thickness of said pad.

7. An apparatus according to claim 1, wherein said first pad section corresponds to a first surface portion of the head, and said second pad section corresponds to a second surface portion of the head.

8. An apparatus according to claim 7, wherein said head has a core in said first surface portion of said head, and does not have a core in said second surface portion of said head.

* * * * *